(12) United States Patent
Perun et al.

(10) Patent No.: US 10,394,869 B2
(45) Date of Patent: Aug. 27, 2019

(54) DYNAMICALLY LINKING INFORMATION IN A NETWORK

(71) Applicant: International Business Machines Corporation, Armonk, NY (US)

(72) Inventors: Stephen G. Perun, Tokyo (JP); Sebastian Wedeniwski, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 15/090,817

(22) Filed: Apr. 5, 2016

(65) Prior Publication Data

US 2017/0147687 A1 May 25, 2017

(30) Foreign Application Priority Data

Nov. 24, 2015 (GB) .................................. 1520736.8

(51) Int. Cl.
| | |
|---|---|
| G06F 17/30 | (2006.01) |
| G06F 16/35 | (2019.01) |
| G06F 17/27 | (2006.01) |
| G06F 17/28 | (2006.01) |
| H04L 29/08 | (2006.01) |
| H04W 4/21 | (2018.01) |
| G06F 17/21 | (2006.01) |

(52) U.S. Cl.
CPC .......... *G06F 16/35* (2019.01); *G06F 17/2775* (2013.01); *G06F 17/2785* (2013.01); *G06F 17/28* (2013.01); *H04L 67/1097* (2013.01); *H04L 67/306* (2013.01); *H04W 4/21* (2018.02); *G06F 17/211* (2013.01)

(58) Field of Classification Search
CPC ....................................................... G06F 16/35
See application file for complete search history.

(56) References Cited

U.S. PATENT DOCUMENTS

| | | | | |
|---|---|---|---|---|
| 9,104,754 | B2 | 8/2015 | Wedeniwski | |
| 2012/0005224 | A1* | 1/2012 | Ahrens | H04W 4/21 |
| | | | | 707/769 |
| 2012/0239682 | A1* | 9/2012 | Wedeniwski | G06F 16/367 |
| | | | | 707/769 |
| 2014/0351744 | A1* | 11/2014 | Jeon | G06F 3/0482 |
| | | | | 715/781 |
| 2015/0256636 | A1* | 9/2015 | Spivack | G06Q 10/10 |
| | | | | 715/736 |

\* cited by examiner

*Primary Examiner* — Usmaan Saeed
*Assistant Examiner* — William P Bartlett
(74) *Attorney, Agent, or Firm* — Daniel Simek; Hoffman Warnick LLC

(57) ABSTRACT

A method for dynamically linking information in a network using natural language processing on a computer system, the information being contained in a message of a user in the network, where a user interface of a user is provided being adapted for receiving and playing natural language input. The method including: (i) recording information from a first user in the network in natural language; (ii) translating the recorded information in natural language to a text information; (iii) identifying topics in the text information based on topics stored in a predefined database; (iv) combining the identified topics in the message with the set of weighted topics in the user profile of the first user; (v) updating a weight of each of the identified topics in the user profile of the first user; and (vi) publishing the text information.

15 Claims, 5 Drawing Sheets

DYNAMICALLY LINKING INFORMATION IN A NETWORK

The present invention relates in general to data processing systems, and in particular, to a method, system and computer program product for dynamically linking information in a network using natural language processing on a computer system.

BACKGROUND

Social and business networks are combined in today's professional world. Social networks may be used to exchange information even for business applications. For example, commercial fleet drivers have a lot of time during the day while they are driving. Historically, they listen to the radio or to their own music, or communicate with workers or friends via a phone or private radio networks. Very popular still is the older technology Citizens Band radio (also known as CB radio), which is limited to short-distance communications on a limited number of channels. One limitation with private radio networks is the driver is forced to listen to conversation that may not be interesting to him.

Today social networking is built on static or manual assignment to topics, people, or areas of interest. At best, social networks make recommendations on areas of interest.

SUMMARY

A method is proposed for dynamically linking information in a network using natural language processing on a computer system, the information being contained in a message of a user in the network, wherein a user interface is provided being adapted for receiving and playing natural language input. A message is defined as a data structure comprising at least the information as well as a set of topics, defined by keywords extracted from the information. A user profile of the user is defined as a data structure comprising at least a set of weighted topics defined by keywords as well as a system of rules used for extracting topics from information. The method includes: (i) recording information from a first user in the network in natural language; (ii) translating the recorded information in natural language to text information; (iii) identifying topics in the text information based on topics stored in a predefined database, in particular by comparing the text information to most likely topics stored in the database; (iv) combining the identified topics in the message with the set of weighted topics in the user profile of the first user; (v) updating a weight of each of the identified topics in the user profile of the first user; and (vi) publishing the text information on the computer system.

According to embodiments, dynamic topics are created in a social network. The method includes analyzing keywords in a natural language conversation and creating a social networking topic that can later be used as the foundation for a conversation. Other parties in the network can then subscribe to the topic and receive subsequent updates. A person's preferences and usage of topics in the social network may help determine which keywords become topics. A person can later select and rank topics important to them which also contributes to keyword selection. The method is designed without manual interactions such that it can be used for example in vehicles to limit driver distraction and create more personalized content streams, which a driver can listen to. The message can also include context from when the translation occurred including sensor information from the device, e.g., GPS location, accelerometer, etc., which can aid subscribing parties applications.

Further, a favorable computer program product is proposed for dynamically linking information in a network using natural language processing on a computer system, the information being contained in a message of a user in the network, wherein a user interface is provided being adapted for receiving and playing natural language input, the message being defined as a data structure comprising at least the information as well as a set of topics, defined by keywords extracted from the information, and wherein a user profile of the user is defined as a data structure comprising at least a set of weighted topics defined by keywords as well as a system of rules used for extracting topics from information, the computer program product comprising a computer readable storage medium having program instructions embodied therewith, the program instructions executable by a computer to cause the computer to perform a method comprising: (i) recording information from a first user in the network in natural language; (ii) translating the recorded information in natural language to text information; (iii) identifying topics in the text information based on topics stored in a predefined database, in particular by comparing the text information to most likely topics stored in the database; (iv) combining the identified topics in the message with the set of weighted topics in the user profile of the first user; (v) updating a weight of each of the identified topics in the user profile of the first user; and (vi) publishing the text information on the computer system.

Further, a data processing system for execution of a data processing program is proposed, comprising computer readable program instructions for performing methods described herein.

BRIEF DESCRIPTION OF THE DRAWINGS

These and other features of this invention will be more readily understood from the following detailed description of the various aspects of the invention taken in conjunction with the accompanying drawings that depict various embodiments of the invention.

DETAILED DESCRIPTION

Figure 1:
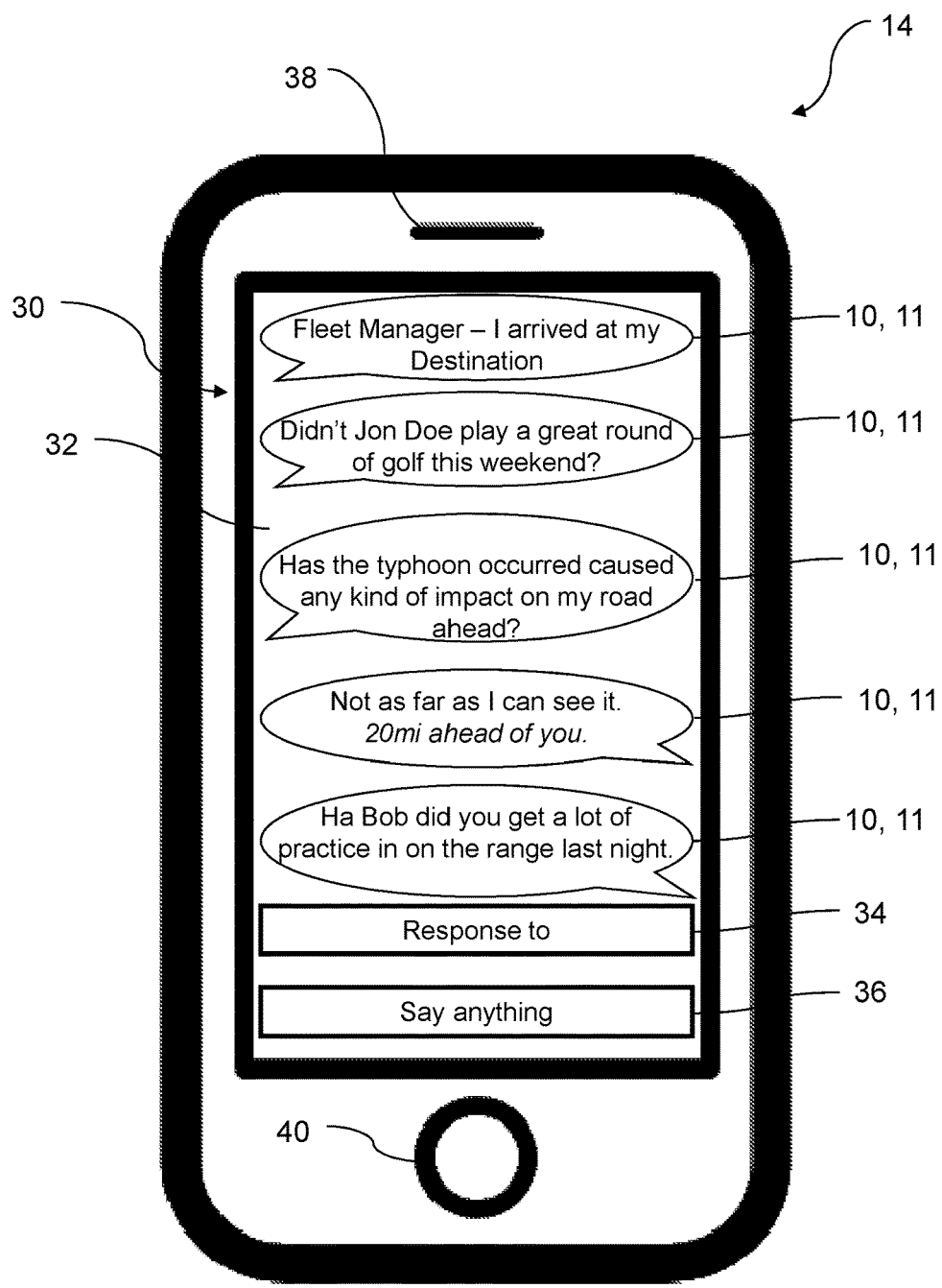
FIG. 1 depicts a user interface for a mobile application according to embodiments.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for dynamically linking information in a network using natural language processing on a computer system. The illustrative embodiments are sometimes described herein using particular technologies only as an example for the clarity of the description. The illustrative embodiments may be used for dynamically linking information in a network using natural language processing on a computer system, wherein a user interface is provided, adapted for receiving and playing natural language input.

The invention relates generally to social communication. Thus the network may be a social network. In particular, it relates to a method and a system to dynamically link ad-hoc communication between people with similar interests, using natural language processing. The method may be used, for example, in a vehicle to limit driver distraction. Today social networking is built on static or manual assignment to topics, people, or areas of interest. At best, social networks make recommendations on areas of interest. According to the inventive technology the topics are assigned dynamically based on what the driver is saying. The context, as, e.g., location, speed, weather, etc. may also be used by interested parties to enhance the experience in real-time. For example, a driver can have a conversation about traffic, and never have to mention where he is because the context is included in his conversation. A city application listening for traffic issues may have both the event of a traffic incident and the context.

According to embodiments, a message may be defined as a data structure comprising at least the information as well as a set of topics, defined by keywords extracted from the information. A user profile of a user may be defined as a data structure comprising at least a set of weighted topics defined by keywords as well as a system of rules used for extracting topics from information. The method may include: (i) recording information from a first user in the network in natural language; (ii) translating the recorded information in natural language to text information; (iii) identifying topics in the text information based on topics stored in a predefined database, in particular by comparing the text information to most likely topics stored in a predefined database; (iv) combining the identified topics in the message to the set of weighted topics in the user profile of the first user; (v) updating a weight of each of the identified topics in the user profile 12 of the first user; and (vi) publishing the text information on the computer system.

The method may further include, for notification of other users and/or subscribing systems: (i) identifying a set of at least one second user in the network by matching topics of a user profile of the at least one second user with the identified topics of the text information; (ii) prioritizing and/or filtering the text information prior to deciding to notify the at least one second user; and (iii) on decision to notify the at least one second user, sending the text information via the network to the at least one second user.

By introducing a dynamic social network via natural language processing a commercial fleet driver, e.g., may customize his/her own experience so as to communicate and listen to content that's important to her/him. Interested parties can also set up subscriptions to the information provided. So, unlike private radio, where a dispatcher has to be constantly listening to any information transmitted by the radio in order to pick up all the information required, with this type of system certain topics can be selected automatically. For example, all arrival and departure information from a commercial fleet driver can automatically be recorded without constant monitoring.

FIG. 1 depicts a user interface 30 for a mobile application 14 according to embodiments of the invention. The mobile application 14 is shown on a conventional smartphone with a touch panel display 32 for displaying messages 10, buttons 34, 36, a loudspeaker 38 for playing recorded voice messages and/or information 11, and a microphone 40 for input of spoken messages 10.

The user interface 30 contains a simple list of all current messages 10 interesting for the registered user and two buttons, the button 36 "Say anything" and button 34 "Response to". The buttons 34, 36 are optional because one button 36 like "say anything" can always be active during the communication. The message 10 contains the original recorded voice 11, and the recorded voice message 11 will be played in the user interface 30 and not just the recognized text of the message 10 displayed.

Figure 2:
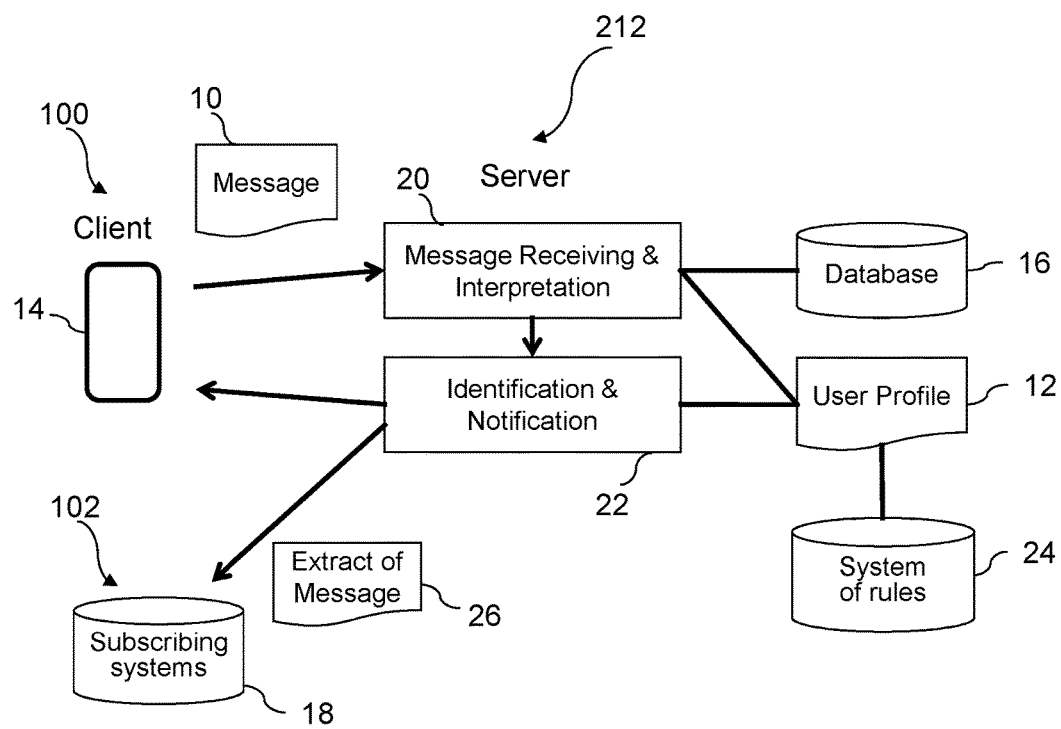
FIG. 2 depicts an overall client-server system architecture according to Embodiments.

According to embodiments, there are no communities structured in the system. It would get too static to handle dynamically changing ad-hoc communication as used by truck drivers on CB radio. A community may be described in this system by only one topic. More precisely, a community may be a dynamic view on the currently communicated messages 10 filtered by subscription criteria defined in a user profile 12 (FIG. 2). Besides, having a fully dynamic creation of community identifiers, i.e., topics, some predefined communities with weights may be useful. For example, a business community identifier "fleet manager" or private community identifier "family" could have a high interest and therefore a high weight. Other predefined communities, like emergency, weather, traffic, or news, might simplify the execution of the algorithm during the interpretation of the message. An example message related to the topic emergency: "Has the typhoon occurred caused any kind of impact on my road ahead?" would make a broadcast to all application subscribers on the road ahead of the asking driver.

FIG. 2 shows an overall client-server system architecture of a computer system/server 212 according to embodiment of the inventions. In the computer system 212, a mobile application 14, used by a user 100 as a client, may be linked to a block function 20 for receiving and interpreting messages 10. Block 20 is linked to a database 16. The database 16 may be configured by at least one out of the group consisting of a predefined dictionary, a predefined ontology, predefined system rules, and a predefined regular expression. For interpretation of the message 10 the block 20 also uses the user profile 12, comprising at least a system of rules 24. After receiving and interpreting the message 10, the translated information may be transferred to a block 22 for identification of the information and notification of other users 102 and/or subscribing systems 18. The block 22 is also linked to the user profile 12, comprising the system of rules 24. On decision for notification of other users 102 and/or subscribing systems 18, an extract of the message 26 may be transmitted to the mobile application 14 again or to subscribing systems 18.

The first user 100 may also be referenced as client 100, whereas the at least one second user 102 may also be referenced as other users 102 and/or clients 102.

According to embodiments, the message 10 may be defined as a data structure comprising at least the information as well as a set of topics, defined by keywords extracted from the information. The user profile 12 may be defined as a data structure comprising at least a set of weighted topics defined by keywords as well as the system of rules 24 for extracting topics from information. The method may include: (i) recording information 11 from the first user 100 in the network in natural language; (ii) translating the recorded information 11 in natural language to text information; (iii) identifying topics in the text information by comparing the text information to most likely topics stored in the predefined database 16; (iv) combining the identified topics in the message 10 to the set of weighted topics in the user profile 12 of the first user 100; (v) updating a weight of each of the identified topics in the user profile 12 of the first user 100; and (vi) publishing the text information on the computer system 212.

The method may further include for notification of other users and/or subscribing systems 18: (i) identifying a set of at least one second user 102 in the network by matching topics of a user profile 12 of the at least one second user 102 with the identified topics of the text information; (ii) prioritizing and/or filtering the text information prior to deciding to notify the at least one second user 102; and (iii) on decision to notify the at least one second user 102, sending the text information via the network to the at least one second user 102.

The system for dynamically linking information in a network using natural language processing on a computer system 212 is based on the three data structures: a message 10, a user profile 12 and a system of rules 24.

The basic data structure of the message 10 may include the following elements: user identifier; recorded voice information 11; recognized text; response to message identifier, which may be empty, if it is not related to another message 10; timestamp of publication, with an accuracy of, e.g., seconds; a set of topics; and context data, which is primarily available from client 100 to server 212, which may be any sensor information from a person or a vehicle/smartphone. Examples for context data may be: speed, time, location (state, city, road, lane), direction, altitude, acceleration/deceleration, and light sensor. Other drivers/users 102 or subscribing systems 18 may have access to the context data.

The user profile 12 may be structured according to: a set of pairs of topic and weight for the topic, which are the unique identifiers for the community subscriptions. Examples may be news (politics, science, US, Japan), weather (alerts or even emergencies), sports (Golf, Jon Doe, PGA, LPGA), work (fleet manager or dispatch, other drivers), friends (Fred, Bob), customers (An Airline, Royal Park, A Hotel Chain), location scope: local (defined by a geofence), regional, global, timestamp of last notification, frequency of notifications (excluding responses) 0 . . . 1 (0 nothing, 1 all), privacy settings, which message context data can be shared, a system of rules, learned out of past communication.

The system of rules 24 may be a set of pairs, where each pair comprises a set of topics and corresponding weights, and where each pair is identifying how frequent which topics in combination are used in messages 10 in a past communication. The system of rules 24 serves for identifying topics if the text information has a weight above a threshold defined in the system of rules 24.

The system of rules 24 may regularly be optimized (e.g., through Boolean Algebra), where each topic inside a set is linked with an AND operation and each set of topics is linked with an OR operation. For example, if only the pair ({bob, golf}, 1000) exists containing the topic golf then "Bob is the only person I talk golf with". Or if the system or rules contains the set {({japan, politics}, 1000), ({weather}, 3)} then "Japan politics is ranked high in past conversations but very little is mentioned about weather".

The system for dynamically linking information in a network using natural language processing is based on two algorithms: first the algorithm to interpret and publish a message from the client/user 100 on the server 212, and second the algorithm to identify and notify the interested clients/users 102 and subscribing systems 18 through the server 212.

Figure 3:
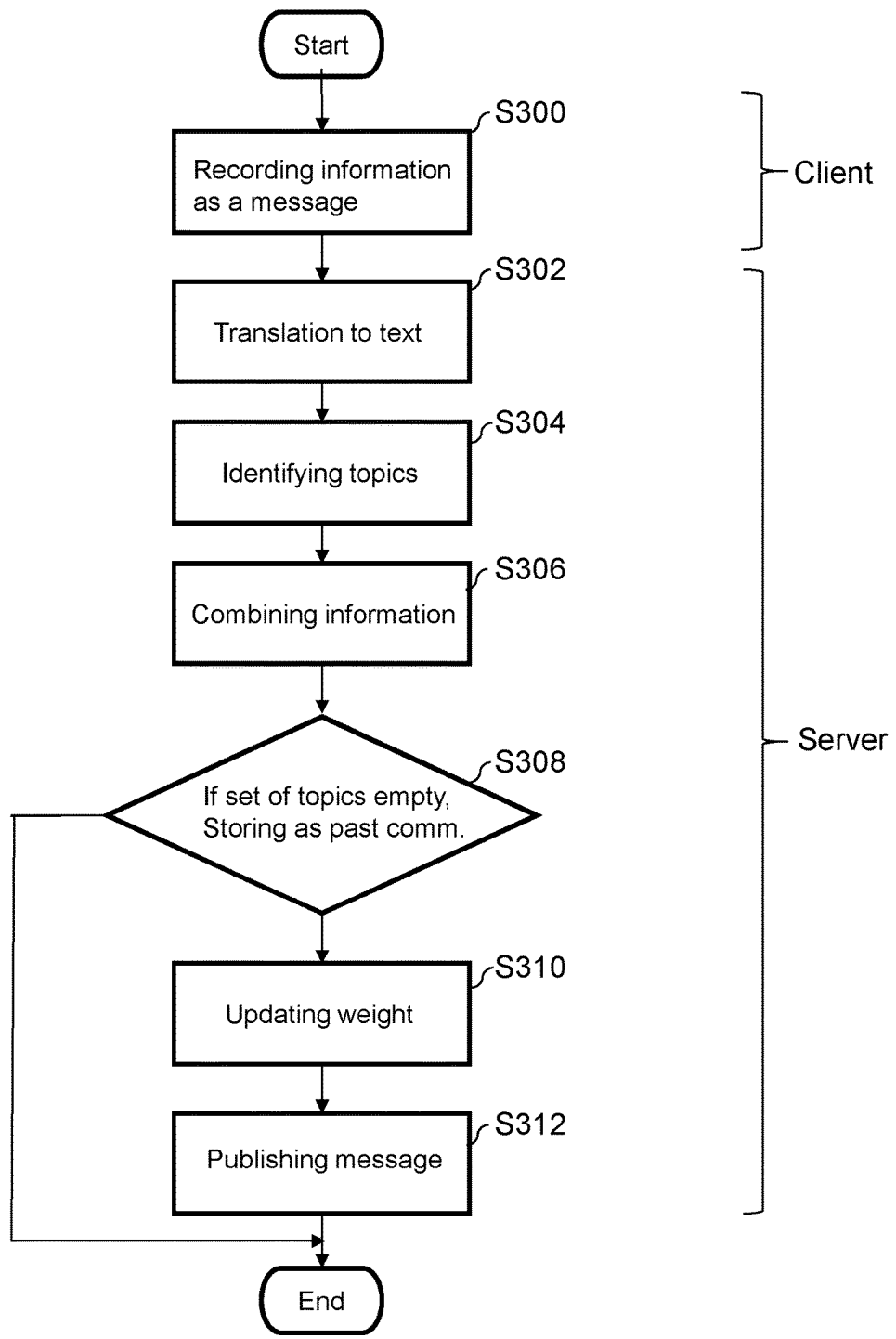
FIG. 3 is a flowchart summarizing an algorithm for receiving and interpretation of a message according to embodiments.

In FIG. 3 a flowchart summarizing the algorithm for receiving and interpreting the message 10, implemented in block 20 of FIG. 2, according to embodiments of the invention is depicted.

The algorithm to interpret and publish the message 10 from the client 100 on the server 212 starts with the recording of the voice in step S300, if either the button 36 "Say anything" or button 34 "Response to" is active. The identifier of the message 10 in focus will be captured if the button 34 "Response to" is used. The recorded voice 11, the location and other context relevant sensor data like speed or directions at the client 100 are sent to the server 212.

Examples include:
Driver says: "Fleet Manager—I arrived at my destination." The fleet manager system is subscribed at the server 212 to messages 10 with these associated topics and receives these updates.
Driver says: "Bad Traffic Accident looks like long delays." The city or traffic provider system is subscribed at the server 212 to these messages 10.

The second step S302 begins at the server 212 where the recorded voice 11 will be translated to text. In the third step S304 the text is used to identify the most likely topics to what the message 10 is associated.

For this purpose an extended profile may be generated for at least one of the topics, comprising at least the database 16, further the generating the extended profile comprising building clusters of features of the keywords, the clusters being specific to the topic. A data structure of weighted keywords may be determined based on the natural language input using the database 16. Further topics may be identified based on a mapping of the extended profile and the data structure of weighted keywords resulting in a preference fit score for the selected topic, where the mapping comprises using at least one out of the group consisting of an N-Gram distance function between data elements of the extended profile and data elements of the data structure of weighted keywords, thresholds specified in the extended profile, and weights of rules, and where the preference fit score is determined based on a combination of a keyword factor related to the extended profile, a preference factor determined by a quadratic mean of weighted keywords, and a numeric preference factor defined through the user interface or a system of rules 24.

Thus, first, the algorithm checks if topics of the user profile 12 ordered by higher weight are matching to the recognized text of the message 10. Similar topics may be identified through a 2-, 3- and 4-Gram distance calculation with different thresholds, e.g. 80%. All topics of all user profiles 12 are stored in a dictionary as a database 16 to match already known topics which are unknown in the user profile 12 associated to the message 10. External dictionaries like Wikipedia may be used to identify new topics of interest to get part of the user profile 12 and the dictionary 16. In addition, the system of rules 24 may be used to identify to which rule (i.e., set of topics) the topics associated to the message 10 fits best. This is the set with the largest intersection and weight. A new rule with the topics associated to the message 10 and with weight one may be added to the system if all intersections are empty or the difference is more than one topic. The context (any sensor information from the person or vehicle) may also contribute to the selection of the rule.

Then in step S306 all information is combined in the data structure message 10 with all found topics (including the topics from the rule) at the set of topics. If the set of topics is empty then the message 10 will only be stored as past conversations in the user profile and the process ends with step S308. Otherwise, in step S310, the weight is increased by one for each identified topic in the user profile and the weight of the associated rule.

Finally, in step S312, the message 10 is published on the server 212 to further process the identification and notification algorithm.

An examples of the algorithm to interpret and publish may further be:

1. The driver presses the button labelled "Say anything" and says "I would like to listen to some sports". The system knows "sports" from the driver's profile, but "golf" and certain players is really where the interest is because the rules {({sport, golf}, 400), ({golf, jon doe}, 300)} are in the system. Topic subscription for "Golf/Jon Doe".
   a. The driver presses the button labelled "Say anything" and says "Didn't Jon Doe play a great round of golf this weekend?". The system selects "Jon Doe" as a topic for publication.
2. The driver presses the button labelled "Say anything" and says "I would like to listen to weather in my area". The system knows "weather" from the driver's profile, topic subscription for "Weather/Area" where area is defined through the context.
   a. The driver presses the button labelled "Say anything" and says "The weather is really affecting the driving conditions." The system selects the "city and area" based on GPS location and selects City/Area as a topic for publication.
3. The driver presses the button labelled "Say anything" and says "Ha Bob did you get a lot of practice in on the range last night". The system knows a driver range is associated with "golf", and "Bob" is a good friend. Topic published to "Bob" but not "golf" since the driver only talks to Bob about golf.
   a. The driver presses the button labelled "Response to" and says "Yes I did, I worked on my putting as well" The system knows it's a response to Bob and publishes the message to him only.
4. The driver presses the button labelled Say Anything and says "Ha Bob I am expecting to get wet on my last few stops." The system knows "Bob" is ranked higher then "weather" where "wet" is associated with "weather" in the system of rules. Topic published to "Bob" but not "weather".
   a. The driver presses the button labelled "Response to" and says "Same here, let's keep our umbrella handy". The system knows it's a response to Bob and publishes the message to him only.
5. The driver presses the button labelled "Say anything" and says "Dispatch tell all my customers I am making good time and I am on schedule for the remainder of the day." The system knows "dispatch" is highly ranked work. Topic published to "dispatch", with location, time, and directions and publish arrival alerts to all "customers".
6. The driver presses the button labelled "Say anything" and says "I was making great time today until I had issues with a flat tire." The system doesn't recognize any defined topics in the dictionary, but scoring starts on keywords like "issue" "flat tire" while analysing past communications.

Figure 4:
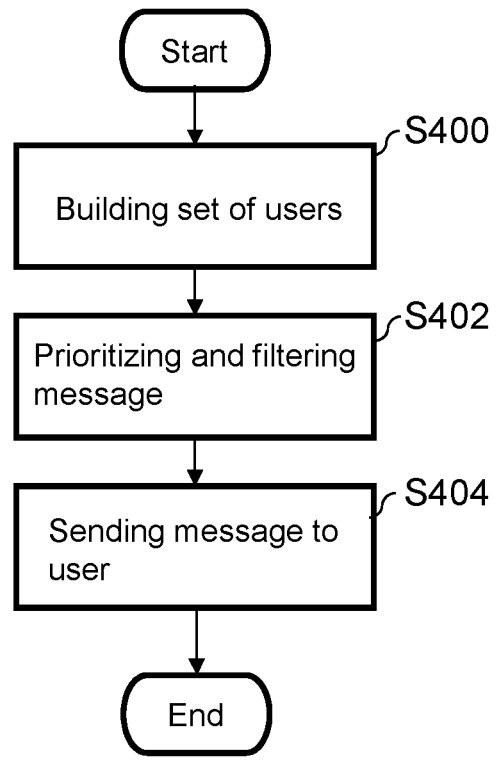
FIG. 4 is a flowchart summarizing an algorithm for identification and notification according to embodiments.

In FIG. 4 a flowchart summarizing the algorithm for identification and notification implemented in block 20 of FIG. 2 according to an embodiment of the invention is depicted.

The algorithm to identify and notify the interested clients 100 starts with the published messages 10. Depending on privacy settings and server configurations, the context data may be removed from the message 10 before it will be sent outside (to the client 100 or a subscribing system 18) which is illustrated as extract of message 26 in FIG. 2. A special case is a message 10 which contains the topic "emergency". Such topics are predefined with the highest weight in every new user profile 12. Then this message will be sent to all active users 100 where the message location is in the scope of the user locations defined by the user profiles 12.

In the first step S400 the set of users to be notified is built. The set starts with all actively to the server connected user identifiers, except the author of the message, and intersects the topics of the user profile 12 with the topics to the new published message 10. As an intermediate result a set of users is defined who are generally interested in the new published message 10. Only the users 100 who received the original message 10 are included to this set of users if the "response to message identifier" is not empty.

The number of published messages 10 and associated notifications may grow significantly in this ad-hoc social communication style even if they are separated by personalized topics. Therefore, a message may be prioritized and filtered in step S402 before it will be decided to notify the client 100 in step S404. First, all users from the set of users to be notified will be removed, where the location of the message is out of scope of the current user location defined by the user profile 12. In addition, also the users 100 will not be notified who had already received too many messages 10 or this message 10 is not important enough in the context (weight of the topics in the user profile is below a threshold).

Therefore, according to a further algorithm, the message 10 may only be sent to the users 100, where $$\frac{(t-s)f \cdot w}{v} \geq p$$

wherein t is a timestamp of the published information or message 10, s is a timestamp of a last notification of the at least one second user, the difference t-s is calculated in seconds, w is the highest weight in the user profile 12 for the set of weighted topics defined by the message 10, v is the sum of all weights of the user profile 12, f is the frequency of notifications of the at least one second user, and p is a predefined parameter, in particular p=5. The threshold number p=5 can be replaced by any other configurable number to not distract the user or driver too much.

For example, if the last message was sent 20 seconds ago, the frequency of notifications is set to f=0.5, because the user has already published 5 messages related to the relevant topic out of totally 10 publications, then the user will be notified.

Further context data may also contribute to the algorithm to weight the relevance to notify the user 100 with the message 10.

The notified user identifiers of the message 10 may be cached for a while to allow a "Response to" at the client.

Figure 5:
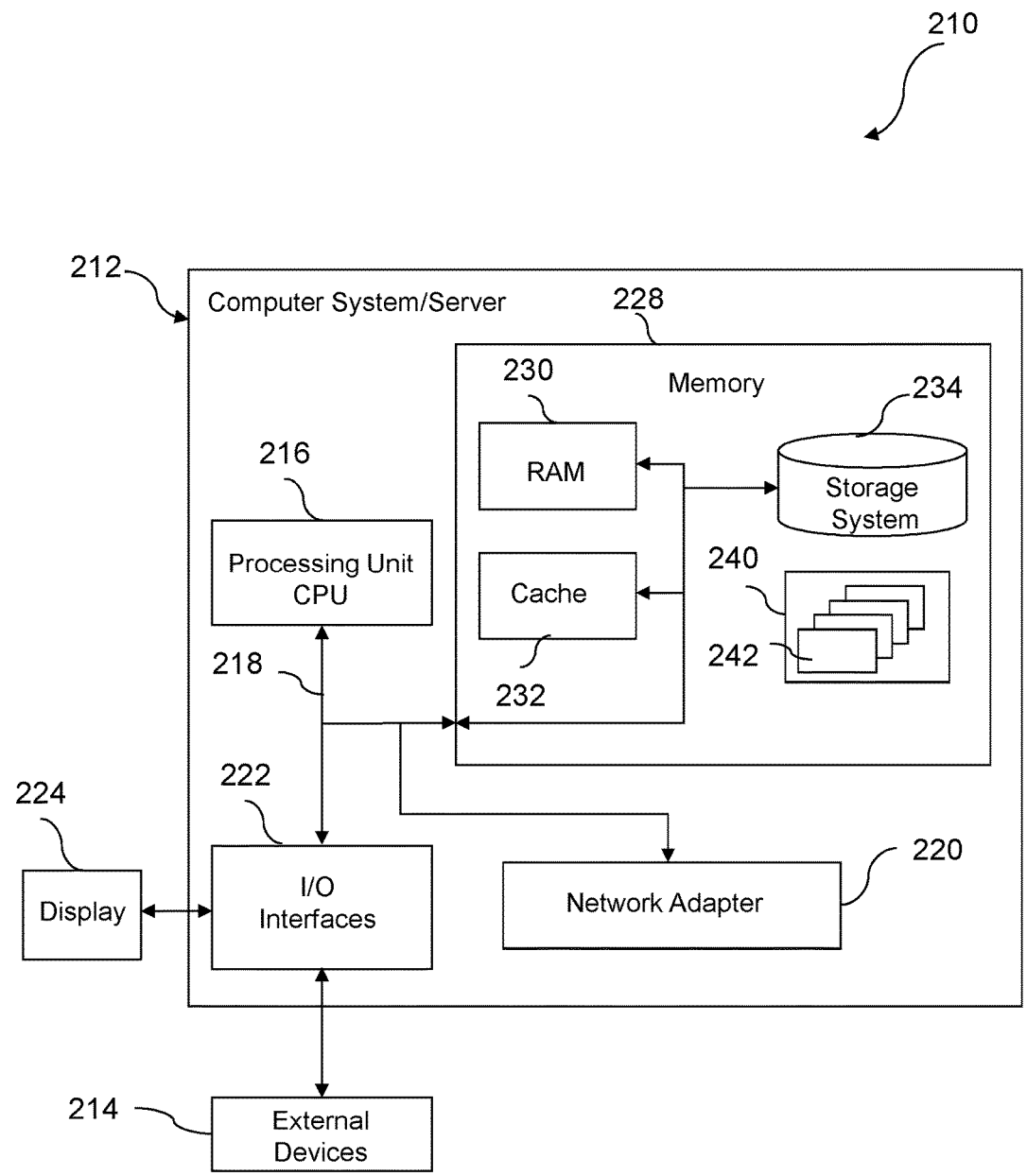
FIG. 5 depicts an example embodiment of a data processing system for executing methods according to embodiments.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dynamically linking information in a network using natural language processing on a computer system, the information contained in a message of a user in the network, wherein a user interface is provided for receiving and playing natural language input, the message being defined as a data structure comprising at least the information as well as a set of topics, defined by keywords extracted from the information, wherein a user profile of the user is defined as a data structure comprising at least a set of weighted topics defined by keywords as well as a system of rules used for extracting topics from information, the method comprising:
    recording information from a first user in the network in natural language;
    translating the recorded information in natural language to text information;
    identifying topics in the text information based on topics stored in a predefined database;
    combining the identified topics in the message with the set of weighted topics in the user profile of the first user;
    updating a weight of each of the identified topics in the user profile of the first user;
    publishing the text information on the computer system; and
    identifying a set of at least one second user in the network by matching topics of a user profile of the at least one second user with the identified topics of the text information, wherein the at least one second user is notified of the message only if $$\frac{(t-s)f \cdot w}{v} \geq p$$

where t is a timestamp of the published information, s is a timestamp of a last notification of the at least one second user, t−s is calculated in seconds, w is a highest weight in the user profile for a set of weighted topics defined by the message, v is a sum of all weights of the user profile, f is a frequency of notifications of the at least one second user, and p is a predefined parameter.

2. The method according to claim 1, further comprising prioritizing and/or filtering the text information prior to deciding to notify the at least one second user;
on decision to notify the at least one second user, sending the text information via the network to the at least one second user.

3. The method according to claim 1, the system of rules comprising a set of pairs, where each pair comprises a set of topics and corresponding weights, further comprising: identifying a frequency of using a topic in combination with another topic in a past communication.

4. The method according to claim 3, further comprising identifying topics if the text information has a weight above a threshold defined in the system of rules.

5. The method according to claim 1, further comprising, if the text information comprises an emergency identifier, notifying all active users subscribing to the network.

6. The method according to claim 1, further comprising, if the set of weighted topics in the user profile of the first user is empty, storing the text information as a past communication in the user profile.

7. The method according to claim 1, the user interface comprising a list of current messages, wherein the message comprises the recorded information in natural language.

8. The method according to claim 1, the network comprising a social network.

9. The method according to claim 1, the user interface implemented on a mobile application.

10. The method according to claim 1, the predefined database configured by at least one out of the group consisting of a predefined dictionary, a predefined ontology, predefined system rules, and a predefined regular expression.

11. The method according to claim 10, further comprising generating an extended profile for at least one of the topics, comprising at least the predefined database, the generating an extended profile comprising building clusters of features of the keywords, the clusters being specific to the topic.

12. The method according to claim 11, further comprising determining a data structure of weighted keywords based on the natural language input using the predefined database.

13. The method according to claim 12, further comprising identifying topics based on a mapping of the extended profile and the data structure of weighted keywords resulting in a preference fit score for the selected topic, where the mapping comprises using at least one out of the group consisting of an N-Gram distance function between data elements of the extended profile and data elements of the data structure of weighted keywords, thresholds specified in the extended profile, and weights of rules, and where the preference fit score is determined based on a combination of a keyword factor related to the extended profile, a preference factor determined by a quadratic mean of weighted keywords, and a numeric preference factor defined through the user interface or a system of rules.

14. The method according to claim 1, the message comprising context information.

15. A computer program product for dynamically linking information in a network using natural language processing on a computer system, the information being contained in a message of a user in the network, wherein a user interface is provided for receiving and playing natural language input, the message being defined as a data structure comprising at least the information as well as a set of topics, defined by keywords extracted from the information, wherein a user profile of the user is defined as a data structure comprising at least a set of weighted topics defined by keywords as well as a system of rules for extracting topics from information, the computer program product comprising a non-transitory computer readable storage medium having program instructions embodied therewith, the program instructions executable by a computer to cause the computer to perform a method comprising:
recording information from a first user in the network in natural language; translating the recorded information in natural language to text information;
identifying topics in the text information based on topics stored in a predefined database;
combining the identified topics in the message with the set of weighted topics in the user profile of the first user;
updating a weight of each of the identified topics in the user profile of the first user;
publishing the text information on the computer system; and
identifying a set of at least one second user in the network by matching topics of a user profile of the at least one second user with the identified topics of the text information, wherein the at least one second user is notified of the message only if $$\frac{(t-s)f \cdot w}{v} \geq p$$

where t is a timestamp of the published information, s is a timestamp of a last notification of the at least one second user, t−s is calculated in seconds, w is a highest weight in the user profile for a set of weighted topics defined by the message, v is a sum of all weights of the user profile, f is a frequency of notifications of the at least one second user, and p is a predefined parameter.

* * * * *